United States Patent
Estival et al.

(10) Patent No.: US 10,279,426 B2
(45) Date of Patent: May 7, 2019

(54) MACHINING DEVICE

(71) Applicant: LASER ENGINEERING APPLICATIONS, Angleur (BE)

(72) Inventors: Sébastien Estival, Talence (FR);
Paul-Etienne Martin, Bordeaux (FR);
Axel Kupisiewicz, Plainevaux (BE)

(73) Assignee: LASER ENGINEERING APPLICATIONS, Angleur (BE)

( * ) Notice: Subject to any disclaimer, the term of this patent is extended or adjusted under 35 U.S.C. 154(b) by 179 days.

(21) Appl. No.: 15/527,124

(22) PCT Filed: Aug. 12, 2016

(86) PCT No.: PCT/EP2016/069212
§ 371 (c)(1),
(2) Date: May 16, 2017

(87) PCT Pub. No.: WO2017/029210
PCT Pub. Date: Feb. 23, 2017

(65) Prior Publication Data
US 2017/0361401 A1    Dec. 21, 2017

Related U.S. Application Data

(63) Continuation-in-part of application No. PCT/EP2016/052384, filed on Feb. 4, 2016.

(30) Foreign Application Priority Data

Aug. 14, 2015   (BE) .................................. 2015/5510

(51) Int. Cl.
*B23K 26/00*   (2014.01)
*B23K 26/06*   (2014.01)
(Continued)

(52) U.S. Cl.
CPC .......... *B23K 26/0643* (2013.01); *B23K 26/02* (2013.01); *B23K 26/046* (2013.01);
(Continued)

(58) Field of Classification Search
CPC ............... B23K 26/384; B23K 26/082; B23K 26/0816; B23K 26/0643; B23K 26/0652; G02B 17/00
See application file for complete search history.

(56) References Cited

U.S. PATENT DOCUMENTS 2,758,502 A    8/1956  Larkin
3,072,798 A    1/1963  Sick
(Continued)

FOREIGN PATENT DOCUMENTS

DE    10347898 A1    5/2005
EP     1528424 A1    5/2005
(Continued)

*Primary Examiner* — Umashankar Venkatesan
(74) *Attorney, Agent, or Firm* — Browdy and Neimark, PLLC

(57) ABSTRACT

Machining device (100) comprising: a light source (33); an optical system (2) for obtaining a spatially offset outgoing light beam (7) remaining parallel to a given position upstream focusing means (9), said optical system (2) comprising: a movable mirror (19) such that its normal is able to depict a trajectory in a three-dimensional space, said optical system (2) being configured such that said first incident light beam (4) and said normal to the movable mirror (19) are separated by an angle (15) comprised between 0° and 15° for all possible positions and orientations of said movable mirror (19); driving means (6) for moving said movable mirror (19); a retro reflection system (21) able to provide a second incident light beam (8) parallel to a first reflected
(Continued)

light beam (23) on said movable mirror (19); focusing means (9) for focusing outgoing light beam (7) on a target (10).

20 Claims, 8 Drawing Sheets

(51) Int. Cl.
| | |
|---|---|
| *G02B 5/122* | (2006.01) |
| *G02B 26/08* | (2006.01) |
| *G02B 26/10* | (2006.01) |
| *B23K 26/082* | (2014.01) |
| *B23K 26/382* | (2014.01) |
| *B23K 26/02* | (2014.01) |
| *B23K 26/046* | (2014.01) |
| *B23K 26/38* | (2014.01) |
| *G02B 27/28* | (2006.01) |
| *B23K 26/384* | (2014.01) |

(52) U.S. Cl.
CPC ............ *B23K 26/082* (2015.10); *B23K 26/38* (2013.01); *B23K 26/382* (2015.10); *B23K 26/384* (2015.10); *G02B 5/122* (2013.01); *G02B 26/0816* (2013.01); *G02B 26/101* (2013.01); *G02B 26/105* (2013.01); *G02B 27/286* (2013.01)

(56) References Cited

U.S. PATENT DOCUMENTS

| | | | | |
|---|---|---|---|---|
| 3,765,742 A | * | 10/1973 | Walles | G01J 3/06 359/209.1 |
| 4,079,230 A | * | 3/1978 | Miyauchi | B23K 26/08 219/121.75 |
| 4,584,455 A | * | 4/1986 | Tomizawa | B23K 26/04 219/121.68 |
| 4,822,974 A | * | 4/1989 | Leighton | B23K 26/0652 219/121.67 |
| 5,093,548 A | * | 3/1992 | Schmidt-Hebbel | B23K 26/0604 219/121.69 |
| 5,523,543 A | * | 6/1996 | Hunter, Jr. | G01J 1/4257 219/121.62 |
| 5,825,469 A | | 10/1998 | Nam et al. | |
| 5,916,461 A | * | 6/1999 | Costin | B23K 26/08 219/121.68 |
| 5,990,444 A | * | 11/1999 | Costin | B23K 26/03 219/121.61 |
| 6,057,525 A | * | 5/2000 | Chang | B23K 26/032 219/121.73 |
| 2002/0033384 A1 | * | 3/2002 | Hirose | B23K 26/0734 219/121.7 |
| 2008/0007501 A1 | * | 1/2008 | Larson | G02B 26/0816 345/84 |
| 2010/0007935 A1 | | 1/2010 | Nishikawa | |
| 2010/0027090 A1 | | 2/2010 | Lettington | |
| 2011/0157294 A1 | * | 6/2011 | Massicot | B23K 26/03 347/224 |
| 2014/0021177 A1 | * | 1/2014 | Koch | B23K 26/36 219/121.69 |

FOREIGN PATENT DOCUMENTS

| | | |
|---|---|---|
| GB | 2000321 A | 1/1979 |
| WO | 0116628 A1 | 3/2001 |
| WO | 2015189241 A1 | 7/2015 |

* cited by examiner

MACHINING DEVICE

TECHNICAL AREA

According to a first aspect, the invention relates to a machining device. More precisely, it relates to a machining device using light for machining a target. According to a second aspect, the invention relates to a method for machining a target or a piece of material by using a light beam, preferably a laser beam.

PRIOR ART

Nowadays, light beams such as laser beams can be used for machining components. Indeed, it is possible to melt or even vaporise a material on a target to create a hole, or an engraved design, for example, or to cut an element in two.

Some devices use a laser beam for machining or engraving a target along a line. Such devices could be named '1D machining devices'. For some applications, it is desired to have a device able to machine a hole in a target.

If the laser beam strikes the target perpendicularly to the surface thereof, the lateral sides of the hole or the cut edge are not perfectly perpendicular to said surface, but generally offset by an angle of about 4° relative to the normal of the surface at which the beam is directed. For some applications, such a deviation of the lateral sides relative to the surface being processed is not acceptable, for certain extremely low tolerance components in precision mechanical applications, such as clock making, for example. One solution consists in directing a laser beam at a slight angle to the normal of the target surface, generally at an angle greater than 4°.

U.S. Pat. No. 7,842,901B2 describes a device for creating a hollow or removing material with the aid of a laser beam. As may be seen in FIG. 1 in this document, for example, it is possible for the light beam to have an angle of attack that is not perpendicular to the target. The excentring system that enables the outgoing light beam to be offset laterally relative to the incoming light beam before focussing may comprise a Dove prism, an Abbe-Koenig prism, or a system consisting of three mirrors. The optical system disclosed in U.S. Pat. No. 7,842,901B2 is relatively complex. In particular, it is necessary to provide rather elaborate driving means because this system is traversing: the driving means must be selected such that they do not interfere with the path of the light beam. Moreover, it requires a compensating optical system to compensate for the geometric inaccuracies in the excentring system. This compensating optical system increases both the size and weight of the apparatus. Moreover, the compensating optical system itself introduces additional complexity. Finally, control of the lateral offset between the incoming and outgoing light beams is delicate.

U.S. Pat. No. 4,822,974 suggests an optical system that enables a light beam to be directed at a target according to an optical path that is not perpendicular to the surface of a sample or target to be processed, see beam 115 in FIG. 1 and beam 115" in FIG. 2 of that document for example. The system comprises a first part, with which it is possible to obtain an outgoing light beam 114 that is offset relative to an incoming light beam 112. An optical focussing is used to focus the outgoing light beam 114 on a target afterwards. This optical system is also rather complex. As in the case of document U.S. Pat. No. 7,842,901B2, it is necessary to provide purpose built, quite complex driving means because the system is traversing: the driving means must be selected such that they do not interfere with the path of the light beam.

SUMMARY OF THE INVENTION

According to a first aspect, one of the objects of the present invention is to provide a device using a light beam for machining a target that is simpler. To this end, the inventors suggest a machining device comprising:
a light source;
an optical system for obtaining from an incoming light beam an outgoing light beam that is spatially offset with respect to said incoming light beam (and configured such that said outgoing light beam remains parallel to a given direction upstream focusing means), said optical system comprising:
a mirror:
having a substantially flat reflecting surface defined by a normal for obtaining a first reflected light beam from a first incident light beam stemming from said incoming light beam,
movable such that its normal is able to depict a trajectory in a three-dimensional space;
said optical system being configured such that said first incident light beam and said normal to the movable mirror are separated by an angle comprised between 0° and 15° for all possible positions and orientations of said movable mirror;
driving means for moving said movable mirror;
a retro reflection system:
positioned with respect to said movable mirror for obtaining from said first reflected light beam a second incident light beam on said mirror for all possible positions and orientations of said movable mirror, for obtaining an outgoing light beam from a reflection of said second incident light beam on said mirror, and
able to provide said second incident light beam on said movable mirror that is parallel to said first reflected light beam for all possible positions and orientations of said movable mirror (in the optical system of the invention);
focusing means for focusing said outgoing light beam on a target.

The normal of the mirror is able to depict a trajectory (or a movement) in a three-dimensional space. In other words, the optical system is configured such that said normal is able to shape a 3D surface, for instance a conical surface, ie a surface that is not planar. Whatever the position and orientation of the movable mirror, the outgoing light beam remains parallel to a given position upstream the focusing means. This is notably possible thanks to the use of the retro reflection system.

The optical system of the device of the invention is configured such that a variation of position of the movable mirror is able to induce a variation of the offset (in two-dimensions or 2D) between incoming light beam and outgoing light beam. In other words, the optical system of the machining device is able to control the spatial offset between the incoming light beam and the outgoing light beam. For instance, outgoing light beam can be offset angularly with respect to incoming light beam and/or translated with respect to incoming light beam. The offset outgoing light beam may then be directed at a workpiece for machining at an angle other than zero relative to the normal of said workpiece, passing through the focussing means. The resultant is a compensation for natural conicity induced during an engraving cut or hole cutting process, or the capability of obtaining cuts, engravings or boreholes with conicities that are positive, neutral or negative by adjusting the offset of the outgoing light beam.

In the optical system of the machining device according to the invention, the driving means may be positioned behind the mirror. That is to say on a side of the mirror that does not receive any light due to the incoming light beam. Accordingly, the optical system according to the invention may thus be characterised as reflective rather than being traversing. This enables the use of simpler driving means (such as 'brushless' type motors, linear or piezoelectric positioning stages, for example). Finally, the machining device of the invention using said optical system is also simpler. It is not only easier to operate, but also easier to maintain. Wearing parts are generally moving parts. With the machining device of the invention, it is generally only one element that is movable: the mirror. A mirror is not expensive compared with the moving parts in the two US documents cited earlier. Moreover, the movable mirror can be guided more simply with the device of the invention. This in turn makes the machining device of the invention easier to maintain, particularly when a component has to be replaced. In the two US documents cited earlier, optical systems—in some cases very complex apparatuses—rotate at high speed. In the device of the invention, only one simple optical element(s) need to move: a mirror. This limits maintenance costs. The device according to the invention uses simple optical elements. It can also be inexpensive and hard-wearing.

The device of the invention could be named 'two-dimensional (2D) machining device'. The outgoing light beam can depict a trajectory (or movement) in a three-dimensional space before (or upstream) the focussing means. In other words, the optical system of the device of the invention is able to impose an offset in 2D (along at least two non parallel directions) between incoming and outgoing light beams (and not only along one direction). This 2D property for the offset is possible with the device of the invention because the normal to the mirror is able to depict a trajectory in a three-dimensional space, and also thanks to the use of the retro reflection system (or retroreflector). One could say, equivalently, that the mirror is movable such that its normal is able to depict a movement in a three-dimensional space. The retro reflection system is able to provide said second incident light beam to the movable mirror that is parallel to said first reflected light beam for all possible positions and orientations of the movable mirror. It is possible, with the optical system of the device of the invention to have a second incident light beam on the movable mirror that is parallel to said first reflected light beam whatever the plane defined by first incident light beam and the normal to the movable mirror. This is possible thanks to the use of the retro reflection system (that could also be name retroreflector). As first reflected light beam and second incident light beam have opposite directions along a same line, one could say that first reflected light beam and second incident light beam are anti-parallel. Two plane mirrors do not constitute a retro reflection system as they are not able to provide a second incident light beam on the movable mirror that is parallel to said first reflected light beam whatever the plane defined by first incident light beam and the normal to the movable mirror. Finally, in a plane comprising for instance the focusing means, the outgoing light beam can depict a trajectory along a surface that is not necessarily planar. This is important if one wants a device able to machine holes.

With the device of the invention, it is possible to have a '2D' property of the offset of outgoing light beam with only one moving element: the mirror. As a consequence only one element for the driving means (one motor, one piezoelectric element for instance) is needed. With the invention, there is no need to provide a synchronization system for synchronizing two different driving elements (two motors for instance) that impose two different 1D movement to two different movable optical elements, each able to impose an offset along one direction between an incoming light beam and an outgoing light beam.

A retro reflection system (or retroreflector) is known by one skilled in the art, see for instance 'Les Instruments d'optique. Etude théorique, expérimentale et pratique', $2^{nd}$ Ed. Luc Dettwiller, Ellipse; 'Optique', E Hecht, Pearson Education; 'Optics and Optical Instruments: an introduction', B. K. Johnson, Dover; 'Exterior Billiards: systems and impacts outside bounded domains', A. Plakhov, Springer Science & Business Media. A retro reflection system is an optical element (or optical system) that allows sending (or providing) a backward light beam from a forward light beam, said backward and forward light beams being parallel for all possible incidence of said forward light beam with respect to said retro reflection system (forward and backward light beams have opposite directions and evolve along a same line; they could be named anti-parallel). Different examples or retro reflection systems are given below.

The optical system of the device of the invention is configured such that the first incident light beam and the normal to the movable mirror are separated by an angle comprised between 0° and 15° for all possible positions and orientations of said movable mirror. In other words, the angle between first incident light beam and first reflected light beam is comprised between 0° and 30° for all possible positions and orientations of the movable mirror. Then, the outgoing light beam can depict, before (or upstream) the focusing means and in a plane perpendicular to the direction of propagation, a curve that is close to a circle, or even a circle. As a consequence, holes (and cuts) of better quality can be made in a target positioned behind the focusing means. As it will be apparent from the detailed description, different preferred embodiments of the device of the invention allow obtaining such an angular separation between incident light beam and the normal to the mirror.

The device according to the invention features other advantages. Its optical system is quite compact. Because of the various optical elements, two dimensions can be used to induce the offset between incoming and outgoing beams, not just one. The use of two dimensions to induce the offset between incoming and outgoing light beams makes it possible to have an optical system (and so a machining device) with relatively small dimensions because the space is used to good advantage. The optical system of U.S. Pat. No. 4,822,974 is rather bulky, particularly if one wishes to have a substantial lateral offset between the incoming light beam and the outgoing light beam. In fact, this lateral offset is particularly defined by the separation between the two prisms. The device according to the invention is also relatively light. The offset between incoming and outgoing light beams can be controlled easily by only adjusting the position between the mirror and the retro reflection system. The volume and weight of said mirror and retro reflection system are both smaller than the assemblies of prisms and/or mirrors used in the known systems. Ultimately, the device of the invention also features a smaller volume and weight for another reason: its optical system is scarcely affected by the faults in the optical excentring elements which enable the lateral offset between incoming and outgoing light beams because the light beam is reflected on the mirror twice. The double reflection enables inaccuracies associated with the mirror and its possible movement to be corrected automatically. In particular, unlike the optical system of U.S. Pat. No. 7,842,901B2 there is no need to provide a compensating optical system. Therefore, the device according to the invention is also simpler because of this autocorrection effected by the double reflection on the mirror.

With the machining device of the invention, outgoing light beam remains parallel to a given direction before hitting the focusing means whatever the position and the orientation of the movable mirror. This allows obtaining holes and cuts of better quality. Upstream the focusing means, the outgoing light beam is able to depict a cylinder (or a cylindrical surface) in general. Except the focusing means, the optical system of the machining device according to the invention is neutral in terms of optical power. Focusing means allows focussing the outgoing light beam on a small area of the target. Typically, said outgoing light beam depicts a cylindrical surface before (or upstream) said focusing means. Different focussing means known to a person skilled in the art may be used. One example is a converging lens. In that case, it is positioned perpendicular to main direction of propagation of outgoing light beam (before focusing). Another example of focusing means is a telecentric lens. Other examples could be used. Preferably, it is the optical system of the machining device of the invention that comprises the focusing means.

The device according to the invention may be used in many applications, for instance (not a complete list): engraving, texturing a surface, printing, boring cavities and holes. With the machining device of the invention, it is possible to have an outgoing light beam that is focussed or concentrated on a very small area of a target (nearly a point) downstream the focusing means. So, the device of the invention could be named laser machining device or laser engraving device.

Various types of driving means known to a person skilled in the art may be used. One example is a motor, preferably an electric motor. However, other examples might also be used. Said driving means are mechanically coupled to the movable mirror.

The light source allows producing the incoming light beam. Preferably, it is a laser source. The laser may be continuous or pulsed, for example. The produced laser beam is a beam in which the wavelength is between 0.2 µm and 2 µm, with a more preferred value of 1 µm. However other types of laser beams (or and so laser sources) with different wavelengths might also be used. Thus, the wavelength of the light beam may vary between 200 nm and 15 µm, for example. Preferably, incoming light beam is circularly polarized. Preferably, the optical system is able to maintain polarisation between incoming and outgoing light beams.

The mirror is positioned such that it is able to:
reflect the first incident light beam according to the first reflected light beam toward the retro reflection system, and to
reflect the second incident light beam for obtaining an outgoing light beam from this second reflection.

According to a possible preferred embodiment, the machining device is characterized in that its optical system is configured such that said incident light beam and said normal of the movable mirror are separated by an angle comprised between 0.01° and 5° for all possible positions and orientations of said movable mirror. Then holes of still better quality can be obtained in the target to machine as the curve depicted by the outgoing light beam before (or upstream) the focusing means and in a plane perpendicular to the main direction of propagation is still closer to a circle, or is even a perfect circle.

According to a possible preferred embodiment, the machining device is characterized in that its optical system is configured such that said incident light beam and said normal of the movable mirror are separated by an angle comprised between 0.1° and 3° and preferably by an angle of 0.5° for all possible positions and orientations of said movable mirror. Then holes of still better quality can be obtained as the curve depicted by the outgoing light beam before the focusing means and in a plane perpendicular to the main direction of propagation is still closer to a circle, or is even a perfect circle.

According to a possible embodiment, the machining device of the invention comprises means (or positioning means) for moving the target to be machined (ie to be irradiated by said outgoing light beam). Different positioning means known by one skilled in the art can be used.

The device suggested by the inventors preferably comprises a deflection system to force a deflection of the outgoing light beam upstream the focusing means. Hence, the deflection system is then comprised between output of the optical system and the focusing means (between second beam guidance system and focusing means when the optical system comprises such a second beam guidance system). With this preferred variant, it is possible to have a marking field that is significantly larger than those currently known. Accordingly, it is possible to obtain marking fields with dimensions ranging from 10*10 mm to 40*40 mm, for example. As mentioned in previous paragraph, the device suggested by the inventors may also comprise means for shifting of moving a target that is to be machined or engraved. The position (angular for example) of the movable mirror may be made dependent on the movement imposed by the deflection system and/or on the position of the target. Position means for moving a target to be machined and deflection system for shifting outgoing light beam upstream the focusing means can be used alone or in combination. Generally, a deflection system (scanner for instance) can provide higher motion speeds than positioning means able to move a target.

According to a possible preferred embodiment, the movable mirror is able to rotate completely about an axis of rotation that is secant to its normal, and said driving means are capable of causing said mirror to rotate about said axis of rotation. In other words, the mirror is able to depict complete revolutions (360°) around said axis of rotation according to this preferred embodiment. In this preferred embodiment, the driving means are capable to induce complete rotations or revolutions of the mirror about the axis of rotation. Then, the driving means preferably comprise an electric motor of the brushless' type. Upstream the focusing means, the outgoing light beam generally describes a cylindrical surface according to this preferred embodiment, remaining parallel to a given direction whatever the position and orientation of the mirror. With this preferred embodiment, it is particularly easy to have the outgoing light beam describing a precession movement behind (or downstream) the focusing means. Such a movement is desirable when it is intended to ensure that all of the machined edges are perpendicular to the surface of the item (or target) being machined. As was noted in the discussion of the prior art, if the laser beam falls on the target perpendicularly to the surface thereof, the lateral sides will not be perfectly perpendicular to said surface, they are generally offset by an angle of about 4°. Unlike the systems described in U.S. Pat.

Nos. 4,822,974 and 7,842,901B2, the drive shaft of the driving means of the optical system of the device of the invention does not interfere with the optical path followed by the light beam here; for some preferred embodiments, the drive shaft is only present behind the movable inclined mirror. In other words, the rotatable inclined mirror can present a part (rear part for instance) that is not traversed by a light beam originating from the incoming light beam. Accordingly, the driving means may be positioned there without interfering with the light path. The device according to the invention is thus simpler and less expensive. The systems of U.S. Pat. Nos. 4,822,974 and 7,842,901B2 require a hollow shaft to allow the light beam to pass when it is intended to induce a precession movement of the outgoing light beam. At the same time, the number of elements that can rotate is limited to the inclined mirror in the device of the invention. It can be rotated more easily and more readily than the prisms of U.S. Pat. Nos. 4,822,974 and 7,842,901B2. The driving means may thus also be smaller and less powerful, further reducing the overall size and weight of the device of the invention. Rotating systems such as are described in U.S. Pat. Nos. 4,822,974 and 7,842,901B2 generally have to be able to rotate quite quickly, at 30,000 rpm, for example. The larger and heavier the elements that have to be rotated are, the more difficult it becomes to cause them to rotate. If the elements to be rotated are large and heavy, such as those described in U.S. Pat. No. 7,842,901B2 for example, a cooling system has to be provided, for example a water cooling system. For one preferred embodiment in which the mirror is rotatable, it may be rotated at speeds from 100 to 200000 revolutions per minute (rpm), for example, and more preferably between 1000 and 100 000 rpm. With respect to a mirror whose orientation can be varied about two or more non parallel directions (tiltable mirror without complete revolutions about a rotation axis), a preferred embodiment of the machining device using a rotatable mirror has the following advantage. For machining holes, it is more efficient: higher speeds of modification of the orientation of the mirror can be obtained, and there are less vibrations. A movement of rotation is more continuous than a movement of change of orientation.

When the mirror is rotatable, its axis of rotation and the normal to the mirror are generally not parallel. Preferably, it is possible to modify the direction of the axis of rotation of the mirror. The maximum angle between the axis of rotation and the normal to the mirror is preferably comprised between 0.1° and 2°, and yet more preferably has a value of 0.5°.

According to another possible embodiment, the mirror is tiltable about two or more directions, and the driving means are capable of changing an inclination of the mirror about these two or more directions. In this case, the driving means preferably comprise one or more piezoelectric positioning stages or tripods or MEMS. Upstream the focusing means, the outgoing light beam generally describes a cylindrical surface according to this preferred embodiment, remaining parallel to a given direction whatever the orientation of the mirror. According to this preferred embodiment, the inclination of the mirror may be variable in two or more directions. An inclining movement may be seen as a (partial) rotating movement about an axis, preferably in the plane of the flat reflecting surface of the mirror. With respect to a mirror that can depict revolutions (or complete rotations) about an axis of rotation, a preferred embodiment of the machining device using a tiltable mirror about two or more directions has the following advantage. It is easier to make holes that are not circular. For instance it is easier to make square holes as it is easier to impose a given trajectory to the outgoing light beam. For instance, for making a square hole, one has to impose four movements along four chosen directions.

According to one possible embodiment, the mirror is translatable (or free, mobile in translation) and said driving means are capable of causing said mirror to perform a translation movement. In this embodiment, the driving means are capable of causing the mirror to perform a translation movement according to one or more directions (two, for example) with respect to the retro reflection system. In this case, the driving means preferably comprise a linear positioning stage. However, other models might also be used. With this preferred embodiment, it is possible to easily modify a lateral offset between incoming and outgoing light beams (before focusing means). By varying the position of the mirror, it is possible to modify the length of the optical path, and so said lateral offset. This will be more apparent in the detailed description. The control of said offset is also very simple because it depends on the position of the mirror.

According to another possible embodiment, the retro reflection system is translatable (or free, mobile in translation) and driving means are capable of causing said retro reflection system to perform a translation movement. Preferably, the driving means able to move the mirror are different from the one able to move the retro reflection system.

According to one possible embodiment, the optical system is configured such that first and second incident light beams are able to hit same flat reflecting surface of said mirror. Then, the device of the invention is particularly simple as it is possible to position the driving means on a side of the mirror that is not traversed by any light beam.

According to another possible embodiment, the mirror has two substantially flat reflecting surfaces:
each of them being defined by a normal,
one of them for obtaining said first reflected light beam from said first incident light beam stemming from said incoming light beam,
another one for reflecting said second incident light beam for providing said outgoing light beam.
In this case, first and incident light beams hit two different reflecting surfaces of the mirror. This allows using a smaller mirror while maintaining incident light beams close to a normal direction to the mirror, as first and second incident light beams hit two different surfaces.

Preferably, the retro reflection system is able to maintain polarization of a light beam, and in particular polarization of the first reflected light beam. This allows reducing or even avoiding any power loss of the first reflected light beam. As it will be apparent from the detailed description, there are different possible embodiments of retro reflection systems able to maintain polarization. Different reflections at different planar (or flat) reflecting surfaces generally take place in a retro reflection system. For maintaining a linear polarization, two possible embodiments of the retro reflection system are the followings:
having an even number of reflections on first planar reflecting surfaces of the retro reflection system with the linear polarization parallel to said first planar reflecting surfaces, and an odd number of reflections on second planar reflecting surfaces with the linear polarization belonging to a plane perpendicular to said second planar reflecting surfaces;

having an odd number of reflections on first planar reflecting surfaces of the retro reflection system with the linear polarization parallel to said first planar reflecting surfaces, and an even number of reflections on second planar reflecting surfaces of the retro reflection system with the linear polarization belonging to a plane perpendicular to said second planar reflecting surfaces.

Preferably, a retro reflection system able to maintain polarization comprises:

a Dove prism and a right-angle isosceles prism, or a Dove prism, a half wave retardation plate, a roof prism, and a polarizing beamsplitter cube, or a Dove prism and two mirrors, or five mirrors.

Other examples are possible.

The retro reflection system can comprise different optical elements. Non limitative examples are given in this paragraph.

According to a possible embodiment, the retro reflection system comprises a cube corner. The associated advantage is that it requires only one simple optical element. Then, the device of the invention is also particularly simple.

According to another possible embodiment, the retro reflection system comprises a Dove prism and a right-angle isosceles prism. This allows having a very simple retro reflection system, and therefore a very simple machining device, while conserving polarization.

According to still another possible embodiment, the retro reflection system further comprises (in addition to the Dove prism and the right-angle isosceles prism) a half wave retardation plate, a roof prism (for instance an Amici roof prism that is known by one skilled in the art), and a polarising beamsplitter cube.

Some of these examples can be used in combination. For instance, the retro reflection system can comprise: two mirrors and a Dove prism, two roof prisms and a Dove prism, five mirrors, a Dove prism and a roof prism. Other combinations and other realizations are possible.

Preferably, the optical system of the machining device of the invention comprises a first beam guidance system for obtaining the first incident light beam by deflection of the incoming light beam. According to this preferred embodiment, it is possible to induce a deflection of the incoming light beam (for instance of about 90°) with the first beam guidance system for obtaining said first incident light beam to the mirror. Such a preferred embodiment can be furthermore compact than known system. The mirror is preferably disposed between driving means able to move it and said first beam guidance system. According to this preferred embodiment, it is possible to use very simple driving means that can easily be coupled with the movable mirror. The first beam guidance system enables the incoming light beam to be deflected by an angle preferably between 30° and 150°, more preferably between 60° and 120°, and according to a yet more preferred variant, by an angle equal to 90°.

Preferably, the optical system of the machining device of the invention comprises a second beam guidance system for obtaining the outgoing light beam by a deflection of a reflection of the second incident light beam on the mirror. According to this preferred embodiment, it is possible to induce for instance a deflection of about 90° in the reflection of the second incident light beam with the second beam guidance system. Such a preferred embodiment can further be more compact than known system. The mirror is preferably disposed between driving means able to move it and said second beam guidance system. According to this preferred embodiment, it is possible to use very simple driving means that can easily be coupled with the movable mirror. The second beam guidance system enables a light beam to be deflected by an angle preferably between 30° and 150°, more preferably between 60° and 120°, and according to a yet more preferred variant, by an angle equal to 90°.

First (respectively second) beam guidance system can comprise for instance a (polarising) beamsplitter cube, and/or a first quarter wave retardation wave. First and second beam guidance systems are two different elements. Preferably, they have same optical properties.

By using first and second beam guidance systems, the optical system of the invention can be still more compact than other known systems. The use of two dimensions to induce the offset between incoming and outgoing light beams makes it possible to create an optical system with relatively small dimensions because the space is used to good advantage. The optical system of U.S. Pat. No. 4,822,974 is rather bulky, particularly if one wishes to have a substantial lateral offset between the incoming light beam and the outgoing light beam. In fact, this lateral offset is particularly defined by the separation between the two prisms. When using first and second beam guidance systems, incoming and outgoing light beams are generally parallel to each other, the offset between them being 'lateral'. Preferably, the movable mirror is positioned between the driving means and the first (respectively second) beam guidance system.

According to a preferred embodiment, the inventors propose a machining device comprising:

a light source;

an optical system for obtaining from an incoming light beam an outgoing light beam that is spatially offset with respect to said incoming light beam (and configured such that said outgoing light beam remains parallel to a given direction upstream focusing means), said optical system comprising:

a first beam guidance system for obtaining a first incident light beam by deflection of the incoming light beam;

a movable mirror for obtaining a first reflected light beam from said first incident light beam;

driving means for displacing (or moving) said movable mirror;

retro reflection system for obtaining a second light beam incident on said mirror from said first reflected light beam;

a second beam guidance system (different from said first beam guidance system) for obtaining an outgoing light beam by deflecting a reflection of said second light beam incident on said mirror;

focusing means for focusing said outgoing light beam on a target;

said optical system being configured in such manner that a change in the position of the movable mirror movable is able to induce a variation in a spatial offset between said incoming light beam and said outgoing light beam.

Preferably, the mirror has a flat reflecting surface defined by a normal. First and second beam guidance systems are two different elements.

Preferably, they have same optical properties.

Preferably, said mirror is translatable and said driving means are capable of causing said mirror to perform a translatory movement.

Preferably, said mirror is tiltable, and in said driving means are capable of changing the inclination of said mirror.

Preferably, the mirror is tiltable around two or more non parallel directions.

Preferably, said mirror is rotatable, and that said driving means are capable of causing said mirror to rotate about an axis de rotation that is not parallel (secant for instance) to the normal of its flat reflecting surface.

Preferably, said mirror is positioned between said driving means and said first beam guidance system, and/or said second beam guidance system.

Upstream the focusing means, the outgoing light beam generally describes a cylindrical surface according to this preferred embodiment, remaining parallel to a given direction whatever the position and orientation of the mirror.

Preferably, first and second beam guidance systems have identical specifications. For instance, first and second polarising beamsplitter cubes of first and second beam guidance systems have identical specifications. According to another example, first and second quarter wave retardation plates of first and second beam guidance systems have identical specification.

Preferably, the optical system of the machining device of the invention further comprises a rotatable half wave plate for modifying a polarization of the incoming light beam, and means for rotating said half wave plate. When the optical system comprises first and second polarising beamsplitter cubes, this rotatable half wave plate can act as a switch. By rotating this rotatable half wave plate, polarization of the light beam rotate. It is then possible to choose a position of the half wave plate such that the light beam is reflected by the first and second polarising beamsplitter cubes, for obtaining an offset outgoing light beam. According to another position of the half wave plate, a light beam is transmitted through first and second polarising beamsplitter cubes, without reflection. Then, outgoing light beam is not spatially offset from incoming light beam. When the mirror rotates, it is then possible to have an outgoing light beam that follows a precession trajectory or not.

The mirror of the machining device of the invention is movable relative to at least one of the following elements: the first beam guidance system, the retro reflection system and the second beam guidance system. According to a preferred variant, the mirror is movable relative to all three of these elements.

For many of the possible positions of the mirror, the mirror is positioned in such manner relative to the first beam guidance system that the optical paths followed by the first incident light beam and the first reflected light beam are different. For many of the possible positions of the mirror, it is positioned in such manner relative to the retro reflection system such that the optical paths followed by the second incident light beam and its reflection on said mirror are different.

The light source of the machining device of the invention may be a cw monomode fibre laser or a pulsed fibre laser for example. According to another possible example, the light source is a laser source with a pulse duration shorter than 10 ps. The device suggested by the inventors preferably comprises a primary optical system for modifying the collimation of the incoming light beam. With this preferred variant, it is possible to use the divergence of the light beam to create an annular (or doughnut-shaped) attack zone around the natural focussing point in order to create boreholes with a precisely controlled diameter. The diameter of the hole can be controlled as a function of the degree of non-collimation of the incoming light beam. One element (a lens for example) of this primary optical system is translatable in a preferred variant.

The machining device suggested by the inventors makes it possible to create negative conicities or clearance angles. It is also possible to cut the movement parts for clock making. It might also be possible to use it to create automobile injector ports or for micro-machining medical devices. The machining device suggested by the inventors can also be used for creating holes of adjustable conicities, in particular holes of null conicities.

According to a second aspect, the inventors suggest a method for machining a target and comprising the steps of:
providing a machining device as described before;
switching on said light source for providing said incoming light beam;
moving said mirror by using said driving means such that its normal depicts a trajectory in a three-dimensional space (or a surface that is not planar);
positioning said target such that said outgoing light beam hits it, by using said positioning means.

The method of the invention can be used for producing negative hole conicities in a target.

The advantages described for the machining device according to the first aspect of the invention also apply to the method according to the second aspect, mutatis mutandis. The different variants for the machining device according to the first aspect of the invention as described in the preceding text also apply to the method according to the invention, mutatis mutandis.

BRIEF DESCRIPTION OF THE FIGURES

These aspects as well as other aspects of the invention will be explained in the detailed description of specified embodiments of the invention, with reference to the drawings in the figures, in which.

The drawings in the figures are not to scale. Generally, similar elements are designated by similar reference signs in the figures. The presence of reference numbers in the drawings is not to be considered limiting, even when such numbers are also included in the claims.

DETAILED DESCRIPTION OF POSSIBLE EMBODIMENTS OF THE INVENTION

Figure 1:
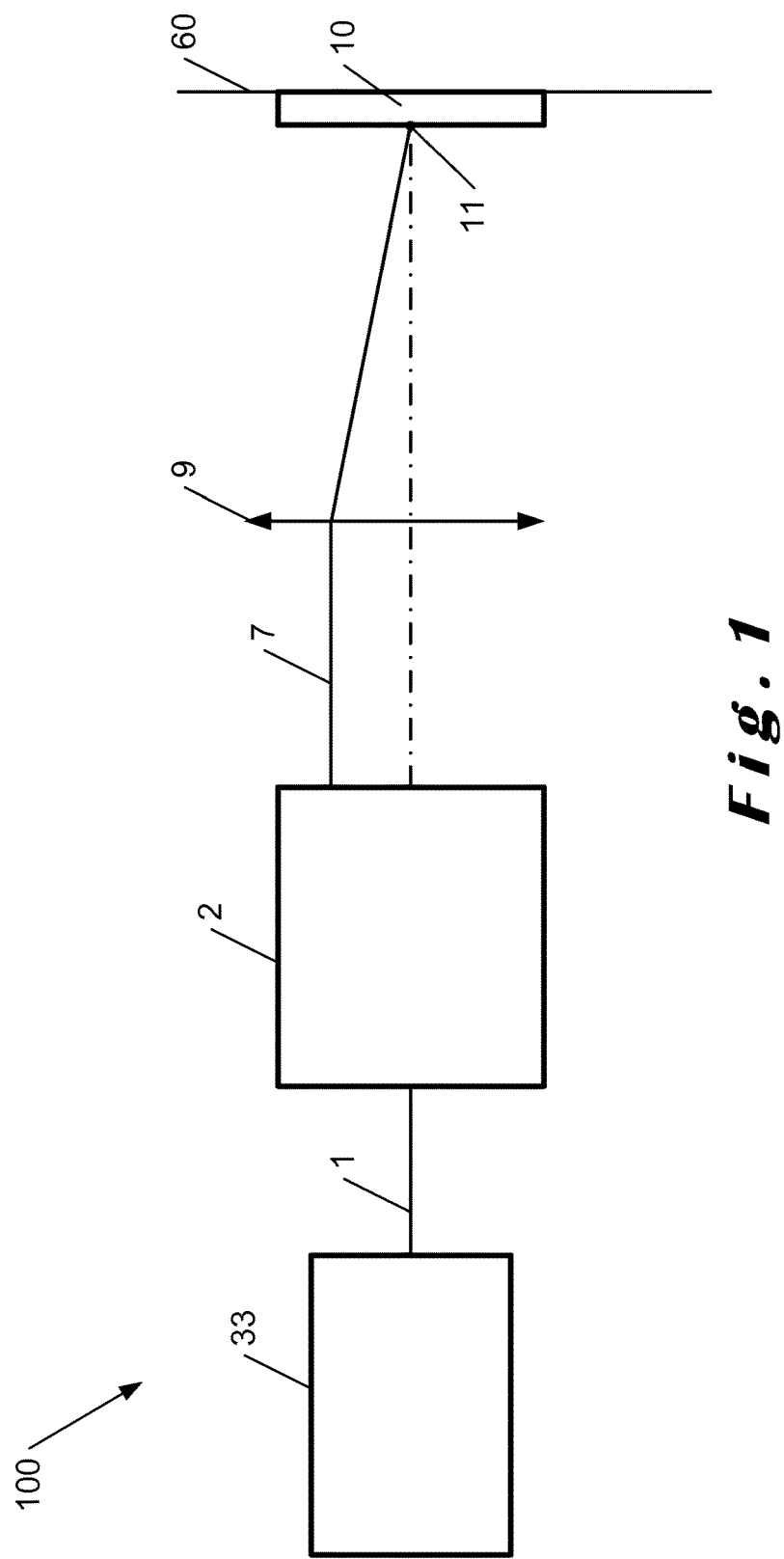
FIG. 1 schematically shows an exemplary embodiment of the machining device according to the first aspect of the invention.

FIG. 1 schematically shows an exemplary embodiment of the machining device 100 according to first aspect of the invention. The machining device 100 comprises a light source 33, a laser source for example, for producing an incoming light beam 1. The machining device 100 further comprises an optical system 2 for obtaining from said incoming light beam 1 an outgoing light beam 7 that is spatially offset with respect to incoming light beam 1. As shown in FIG. 1, outgoing light beam 7 is focused on a target 10 by focusing means 9, a convergent lens for instance. Such focusing means 9 are then part of the machining device 100 and preferably of its optical system 2. In the embodiment shown in FIG. 1, the machining device 100 also comprises positioning means 60 for moving the target 10. The latter 10 is typically placed on said positioning means 60 for obtaining a desired positioning of the target 10 regarding outgoing light beam 7. Preferably, the optical system 2 allows inducing a rotating movement of outgoing light beam 7 before (or upstream) the focusing means 9 (in that case, outgoing light beam 7 nevertheless remains parallel to a given direction upstream focusing means 9). Then, said outgoing light beam 7 can describe a precession movement downstream the focusing means 9 about a point 11 (or small area 11) of the target 10 to be machined.

Positioning means 60 may be translation positioners, for example five-axis systems such as CNC type machines. When mirror 19 is rotatable, it is possible either to allow the mirror 19 to rotate continuously, regardless of the position of target 10, or on the other hand to render the angular position of mirror 19 dependent on the position of target 10 in order to process target 10 at an angle determined by its position.

Figure 2:
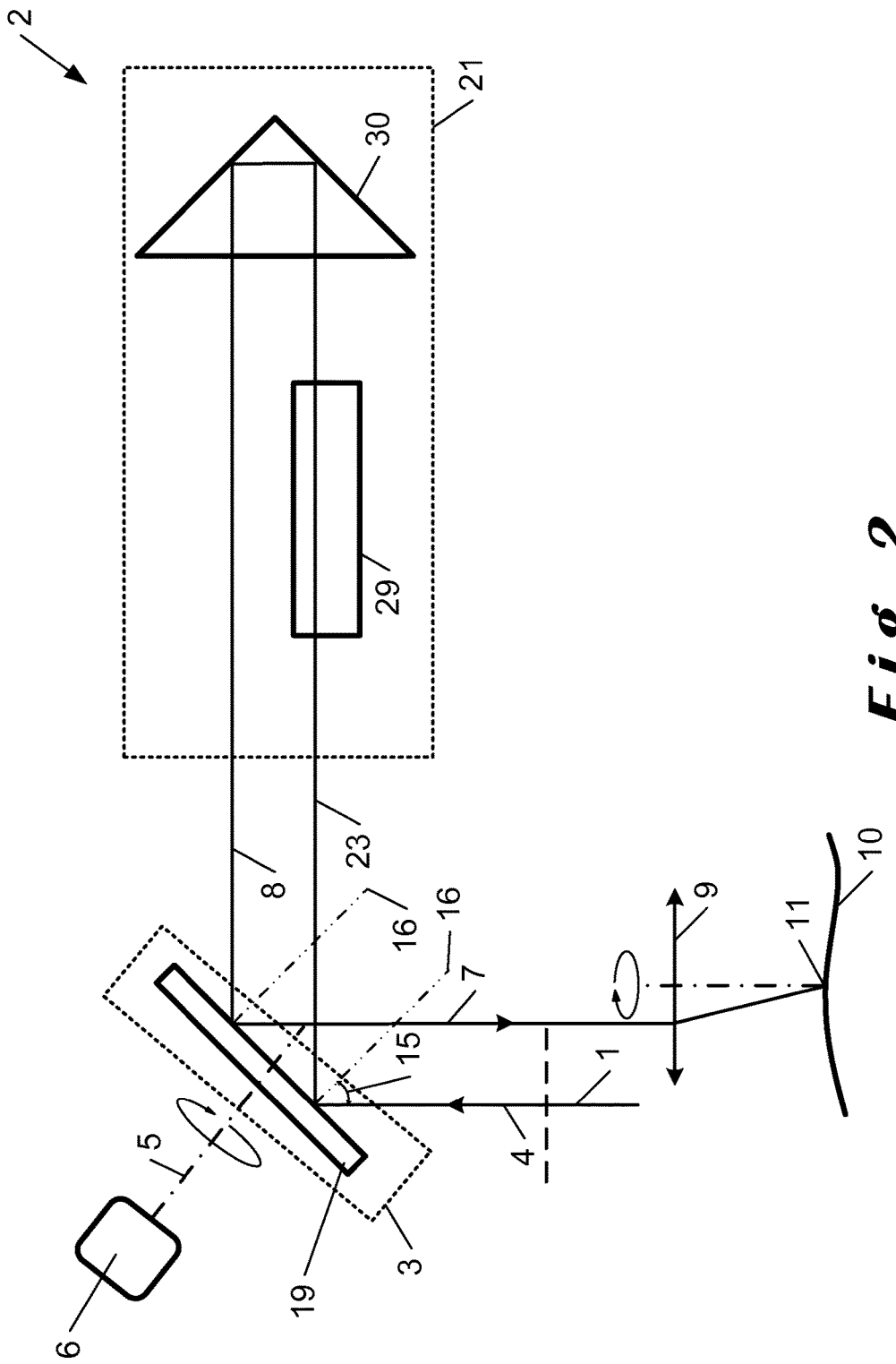
FIG. 2 shows an exemplary embodiment of the optical system comprised in the machining device of the invention.

FIG. 2 shows an exemplary embodiment of the optical system 2 of the machining device 100 according to the invention. Incoming light beam 1 is a light beam produced by the light source 33 and travelling mainly outside the optical system 2, whereas first incident light beam 4 travels only inside optical system 2. First incident light beam 4 can be obtained from a deflection of incoming light beam 1 (see some possible embodiments such as in FIGS. 3 and 5 to 7) or not (examples shown in FIGS. 2 and 4). In the embodiment shown in FIG. 2, first incident light beam 4 and incoming light beam 1 are along a same linear trajectory. The optical system 2 further comprises a movable mirror 19 which allows obtaining a first reflected light beam 23 by reflection of the first incident light beam 4. The optical system 2 also comprises a retro reflection system 21 for directing first reflected light beam 23 such that it comes back to the mirror 19. In other words, a second incident light beam 8 to the mirror 19 can be obtained from the first reflected light beam 23 thanks to the retro reflection system 21. From a reflexion of the second incident light beam 8 on the mirror 19, an outgoing light beam 7 can be obtained. The optical system 2 is configured such that outgoing light beam 7 can be spatially offset from incoming light beam 1 (and such that said outgoing light beam 7 remains parallel to a given direction upstream focusing means 9). In the example shown in FIG. 2, incoming 1 and outgoing 7 light beams are offset transversally. In the embodiment shown in FIG. 2, the mirror 19 is rotatable completely about a rotation axis 5, and driving means 6 are capable of causing the mirror 19 to rotate about said rotation axis 5. The optical system 2 of the machining device 100 is configured such that first incident light beam 4 and the normal 16 to the mirror 19 are separated by an angle 15 comprised between 0° and 15° for all possible positions and orientation of the movable mirror 19°, preferably between 0.01° and 5°, and still more preferably between 0.1° and 3° (this angle 15 is not shown on scale in FIG. 2 for clarity reasons). The optical system 2 is configured such that a change in position between the mirror 19 and the retro reflection system 21 is able to induce a variation of the spatial offset between incoming 1 and outgoing 7 light beams. In the embodiment shown in FIG. 2, depending on the angular position of the mirror 19, the outgoing light beam 7 will follow a different trajectory. The optical system 2 comprises focusing means 9 for focusing the outgoing light beam 7 on a target 10. In the embodiment of FIG. 2, the rotating movement of outgoing beam 7, due to rotation of the mirror 19, can serve to drive the precession of the machining light beam (outgoing light beam 7 downstream of optical focussing 9) about a point 11 that is to be machined. This is illustrated by arrows describing circles in FIG. 2.

In addition to the rotation movement of the mirror 19, driving means 6 of the optical system 2 could also comprise means for imposing a movement of translation to the mirror 19 and/or means to change the inclination of the mirror 19 (mirror 19 tiltable about two or more non parallel directions and driving means able to modify the inclination of the mirror 19 such as a piezoelectric system). The interest of combining a movement of translation and rotation for the mirror 19 is explained in relation to FIG. 6. In particular, a relative movement of rotation between the mirror 19 and the retro reflection system 21 allows obtaining precession of the outgoing beam 7 beyond focusing means 9, whereas a relative movement of translation between them allows modifying the angle by which the target 10 is hit by the outgoing beam 7 beyond focusing means 9.

Examples of driving means 6 are an electrical motor and a brushless motor. Other driving means 6 could be used.

The retro reflection system 21 of the optical system 2 of FIG. 2 comprises a Dove prism 29, and a right-angle isosceles prism 30. Other examples are possible, as described below.

Figure 3:
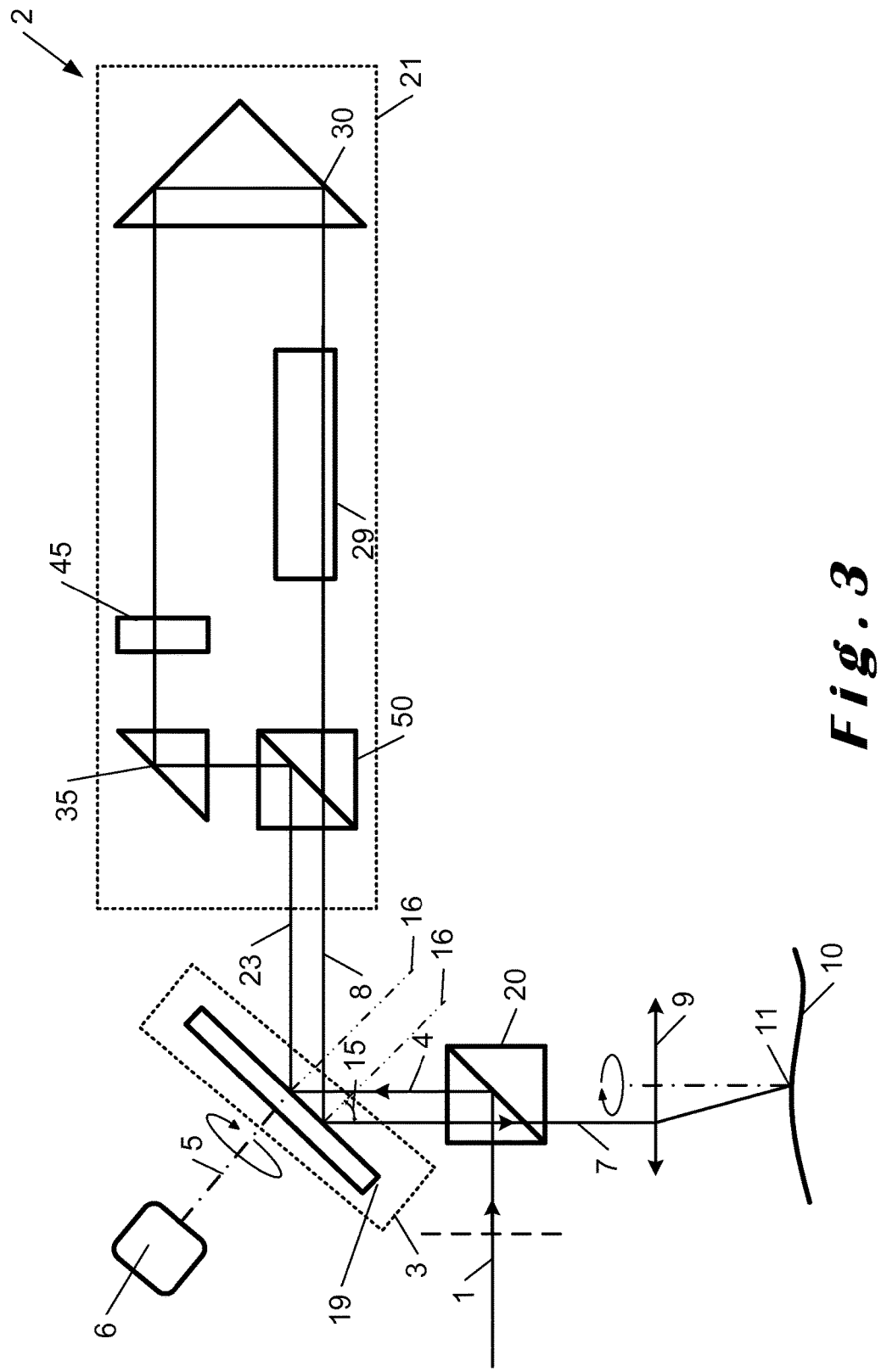
FIG. 3 shows another exemplary embodiment of the optical system comprised in the machining device of the invention.

FIG. 3 shows another exemplary embodiment of the optical system 2 comprised in the machining device 100. Here, the retro reflection system 21 comprise a Dove prism 29, a right-angle isosceles prism 30, a half wave retardation plate 45, a roof prism 35, and a polarising beamsplitter cube 50. Driving means 6 allow rotating the mirror 19 with respect to the retro reflection system 21. Driving means 6 could comprise further means for imposing a relative movement of translation between the mirror 19 and the retro reflection system 21 and/or for changing the relative inclination between the mirror 19 and the retro reflection system 21. In the embodiment shown in FIG. 3, the optical system 2 further comprises a first beam guidance system 20 for obtaining the first incident light beam 4 to the mirror 19 from a deflection of the incoming light beam 1. The first beam guidance system 20 can be for instance a polarising beamsplitter cube. Other optical elements known by the one skilled in the art could be used. The embodiment shown in FIG. 3 presents some advantages such as: small mirror 19, only one half wave retardation plate needed.

Figure 4:
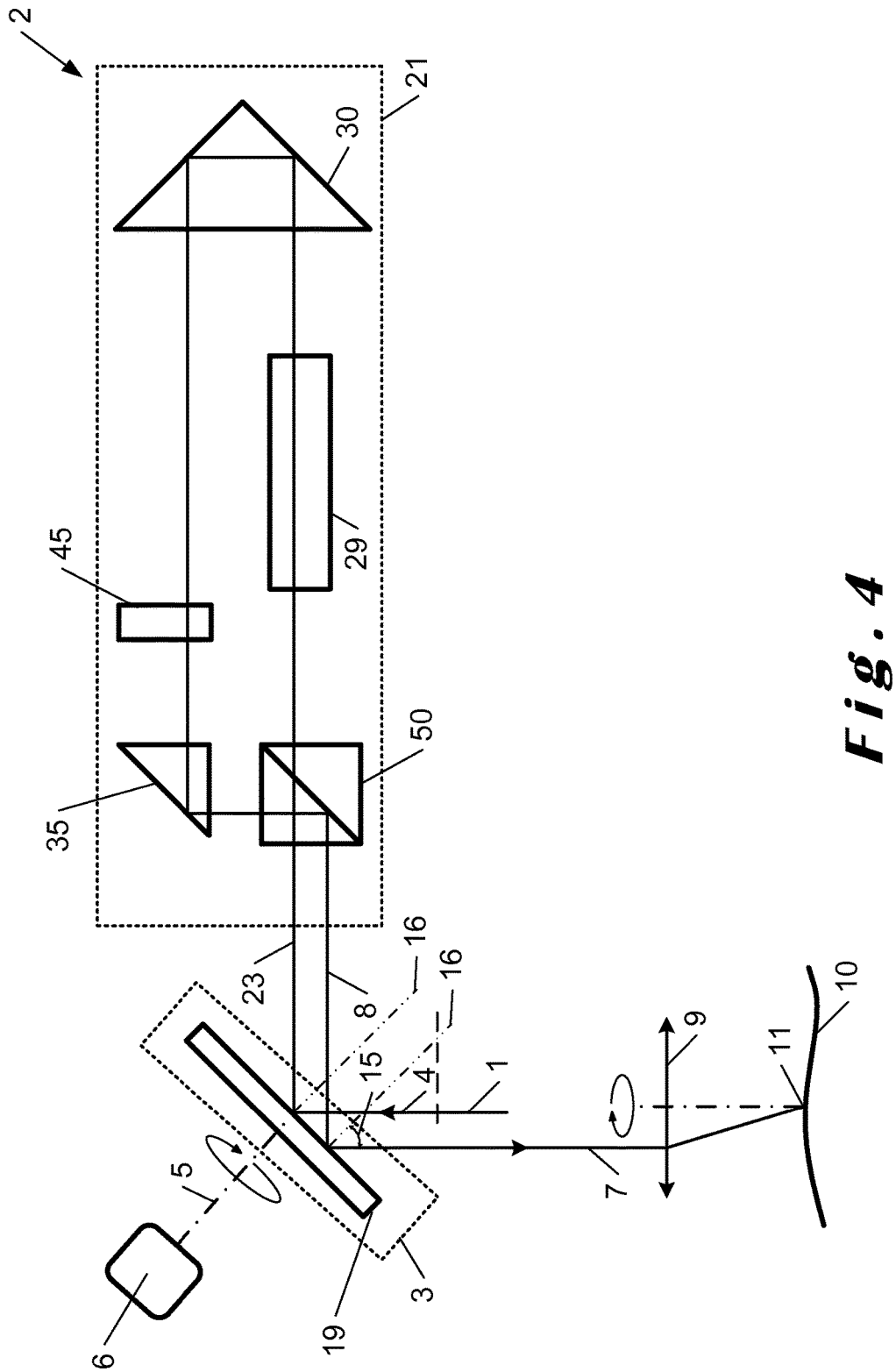
FIG. 4 shows another exemplary embodiment of the optical system comprised in the machining device of the invention.

FIG. 4 shows another exemplary embodiment of the optical system 2 comprised in the machining device 100. Here, the retro reflection system 21 comprise a Dove prism 29, a right-angle isosceles prism 30, a half wave retardation plate 45, a roof prism 35, and a polarising beamsplitter cube 50. Driving means 6 allows rotating the mirror 19 with respect to the retro reflection system 21. Driving means 6 could comprise further means for imposing a relative movement of translation between the mirror 19 and the retro reflection system 21 and/or to change the relative inclination between the mirror 19 and the retro reflection system 21.

According to other possible embodiments, the mirror 19 of FIGS. 2 to 4 is fixed in rotation but tiltable about two or more non parallel directions and the driving means 6 are able to modify the inclination of the mirror 19 about said two or more directions.

In the different embodiments shown in FIGS. 2-4, angle 15 between first incident light beam 4 and the normal 16 to the mirror 19 is not shown on scale for clarity reasons. As mentioned before, this angle is comprised between 0° and 15°, preferably between 0.01° and 5°, more preferably between 0.1° and 3°, and is still more preferably equal to 0.5°, for all possible positions and orientations of the movable mirror 19.

Figure 5:
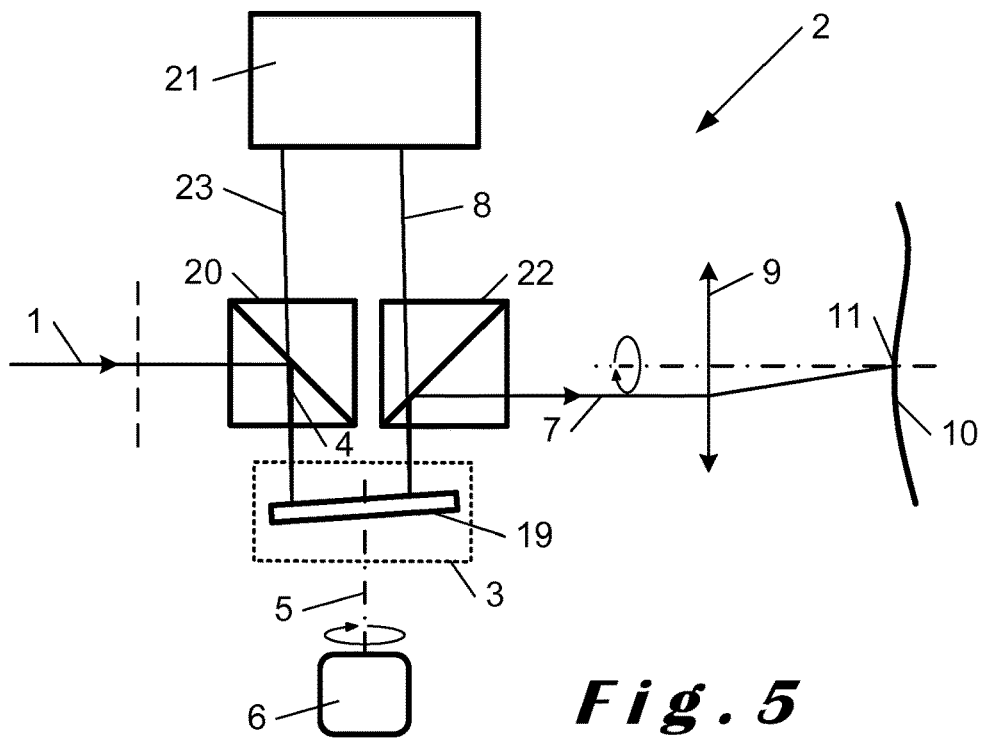
FIG. 5 shows one preferred embodiment of the optical system comprised in the machining device of the invention.

FIG. 5 shows a preferred embodiment of the optical system 2 comprised in the machining device 100. It comprises the following elements;

a first beam guidance system 20 with which an incoming light beam 1 can be deflected to obtain a first incident light beam 4;

a movable mirror 19, inclined, to reflected the first incident light beam 4 and obtain a first reflected light beam 23. Movable mirror 19 is inclined in such manner that the normal 16 thereof is not parallel to said first incident light beam 4 (for clarity reasons, said normal 16 is not shown in FIG. 5). Movable mirror 19 might be referred to as excentring system 3 because it serves to create a lateral offset between incoming light beam 1 and an outgoing light beam 7. In the preferred example shown in FIG. 5, mirror 19 is rotatable. Thus, it is able to rotate completely about an axis of rotation 5.

Driving means 6 for moving (rotating in the example of FIG. 5) movable mirror 19.

Retro reflection system 21 for creating a second light beam 8 incident on movable mirror 19 from the first reflected light beam 23 and parallel to the latter whatever the orientation of the movable mirror 19.

A second beam guidance system 22 to obtain an outgoing light beam 7 by deflecting a light beam obtained by reflection of second light beam 8 incident on movable mirror 19.

Focusing means 9 for focussing outgoing light beam 7 to a point 11 of a target 10.

The rotating movement of inclined movable mirror 19, causes outgoing light beam 7 to describe beyond focussing means 9 a precession movement about the focussing point 11 of the target 10. Focussing point 11 is for example a machining point 11. Rather than using a mirror 19 that can rotate completely about an axis of rotation 5, it could be possible to use a mirror 19 that is tiltable about at least two directions that are not parallel, and driving means 6 able to modify the inclination of said mirror 19 about said non parallel directions.

The optical system 2 shown in FIG. 5 may function as follows. An incoming light beam 1 enters the optical system 2. Incoming light beam 1 is directed toward inclined movable mirror 19 by first beam guidance system 20 and form first incident light beam 4. First incident light beam 4 is reflected by inclined movable mirror 19. The first reflected light beam 23 obtained by the reflection of incoming light beam 1 on mirror 19 travels toward retro reflection system 21. The first reflected light beam 23 is retro reflected to obtain a second incident light beam 8 to the mirror 19, parallel to said first reflected light beam 23 for all position and orientation of the mirror 19. This second incident light beam 8 is reflected by mirror 19 and the light beam reflected in this way is deflected by second beam guidance system 22 to obtain outgoing light beam 7. Outgoing light beam 7 is directed to the outlet and is offset laterally relative to incoming light beam 1. Focussing means 9 allow focussing outgoing light beam 7 to a point 11.

The offset between outgoing light beam 7 and incoming light beam 1 before focussing means 9 is a function particular of the distance traveled by the light beam between its two reflections at inclined mirror 19, and of the angle between the normal 16 to inclined mirror 19 and the axis of rotation 5.

When inclined mirror 19 is rotated, outgoing light beam 7 also begins to rotate because the normal 16 to inclined mirror 19 describes a precession movement. In particular, if mirror 19 is rotating continuously, outgoing light beam 7 also rotates continuously about the axis represented as a dotted-dash line in FIG. 5, at the same rotating speed as mirror 19.

As is shown in FIG. 5, outgoing light beam 7 is focussed on a target 10 by an optical focussing 9. The rotating movement of outgoing light beam 7 serves to drive the precession of the machining light beam (beam downstream of optical focussing 9) about point 11 that is to be machined.

The preferred embodiment of FIG. 5 present some advantages. First 4 and second 8 incident light beams hit the mirror 19 with an angle that can be chosen very close to 90°, ie very close to the normal 16 to the mirror 19 (thanks the deflections of about 90° carried out by first 20 and second 22 beam guidance systems, and the relative position of mirror 19 with respect to said first 20 and second 22 beam guidance systems). This allows having a precession ring described by the outgoing light beam 7 beyond the focussing means 9 that is nearly of perfect circle. First 4 and second 8 incident light beams hit the mirror 19 with same incident angles (as second incident light beam 8 is parallel to first reflected light beam 23 whatever the position of the mirror 19). This allows improving quality of the machining.

The lateral offset between outgoing light beam 7 and incoming light beam 1 may be adjusted by varying the distance traveled by the light beam between the first 20 and second 22 beam guidance systems, that is to say adjusting the lengths of the paths of the first incident light beam 4, the first reflected light beam 23, the second incident light beam 8 and the light beam obtained by the reflection of said second incident light beam 8 on mirror 19.

The distance traveled by the light beam between the first 20 and second 22 beam guidance systems may be varied by causing mirror 19 to perform a translation movement 24 such that its position relative to the first beam guidance system 20 and the second beam guidance system 22 is changed.

Figure 6:
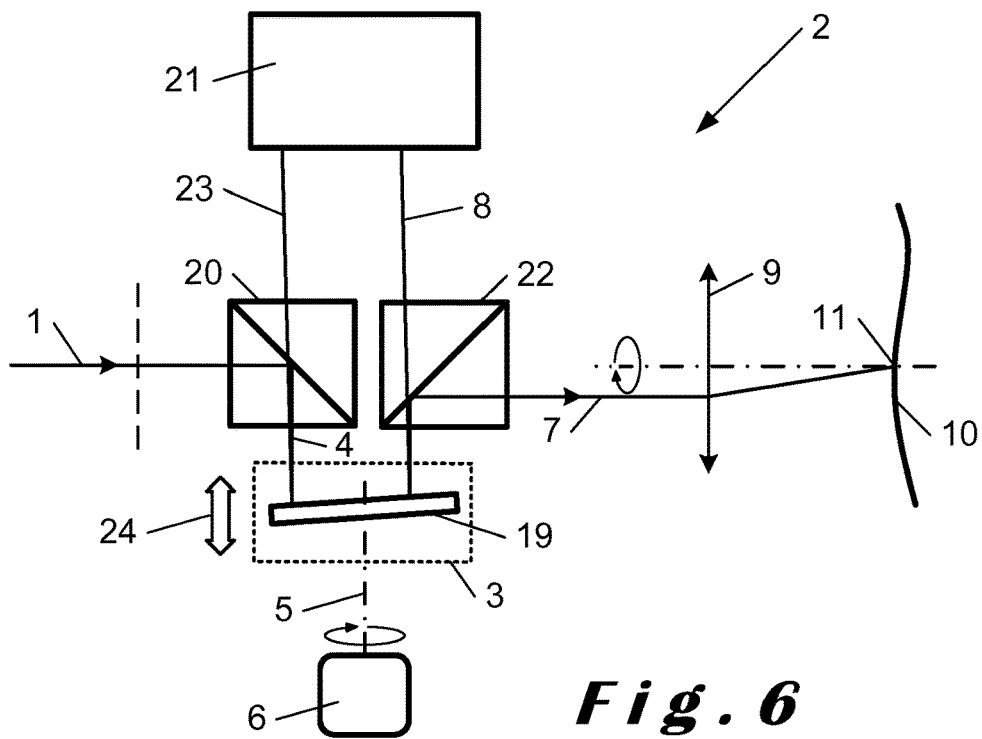
FIG. 6 shows another preferred embodiment of the optical system comprised in the machining device of the invention.

This principle is illustrated in FIG. 6 for a preferred embodiment in which mirror 19 is also rotatable. Translation movement 24 shown in FIG. 6 is along only one direction. However, it is possible to provide driving means 6 such as they are able to cause movable mirror 19 to carry out a translation movement in two or three dimensions. According to another possible embodiment, mirror 19 is rotatable, and retro reflection system 21 are translatable. Then, driving means 6 are preferably able to rotate the mirror 19 and to translate the retro reflection system 21.

Referring to FIG. 6, the distance traveled by the light beam between the first 20 and the second 22 beam guidance systems increases if mirror 19 moves farther way from first beam guidance system 20 and second beam guidance system 22, and this in turn increases the lateral offset between outgoing light beam 7 and incoming light beam 1 before hitting focussing means 9. Conversely, the distance traveled by the light beam between the first 20 and the second 22 beam guidance systems decreases if mirror 19 moves toward first beam guidance system 20 and second beam guidance system 22, and this reduces the lateral offset between outgoing light beam 7 and incoming light beam 1 before hitting focussing means 9.

If an optical focussing 9 is implemented downstream the optical system 2, it is then possible to direct the outgoing light beam 7 at a point 11 of a target 10 according to different angles of incidence by varying the distance between mirror 19 and the first 20 and second 22 beam guidance systems.

First 20 and second 22 beam guidance systems may comprise various elements, such as (not a complete list): an ordinary beamsplitter cube, a polarising beamsplitter cube or a combination of a polarising beamsplitter cube and a quarter wave retardation plate. If a quarter wave retardation plate is used, its rapid axis will preferably be inclined at 45° to the direction of the polarisation reflected by the polarising beamsplitter cube.

Figure 7:
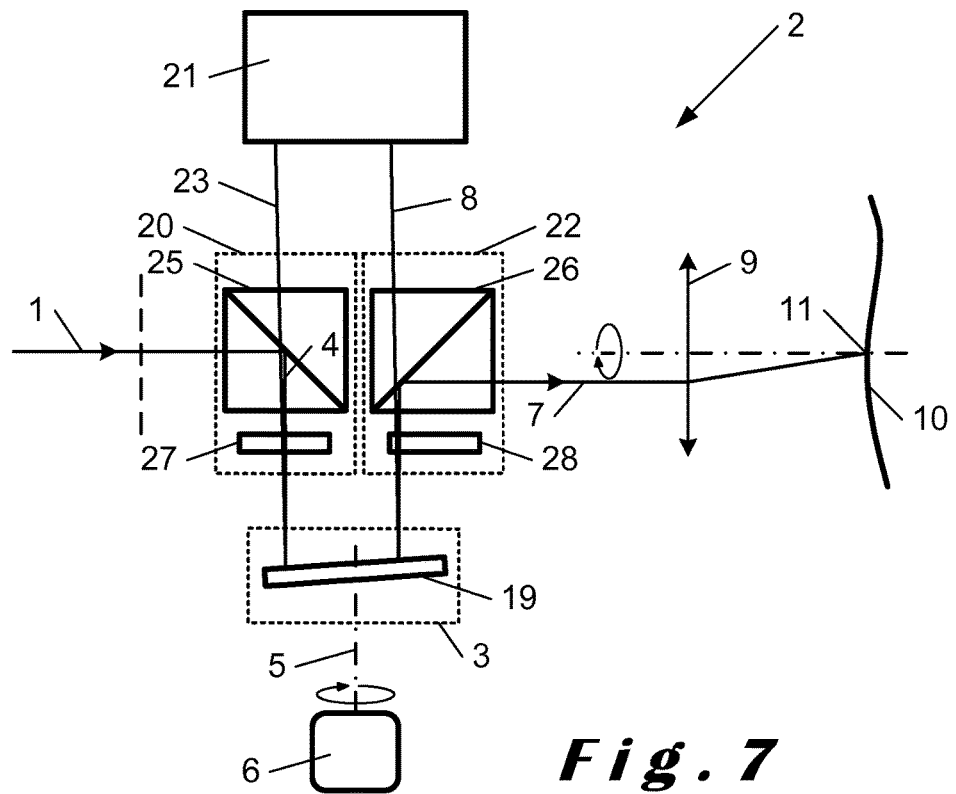
FIG. 7 shows another preferred embodiment of the optical system comprised in the machining device of the invention.

FIG. 7 shows a preferred embodiment in which first beam guidance system 20 (or second beam guidance system 22) comprises a first polarising beamsplitter cube 25 (or a second polarising beamsplitter cube 26) and a first quarter wave retardation plate 27 (or a second quarter wave retardation plate 28). These elements are known to a person skilled in the art. The specifications of first polarising beamsplitter cube 25 and second polarising beamsplitter cube 26 are preferably identical. The specifications of first quarter wave retardation plate 27 and second quarter wave retardation plate 28 are preferably identical.

If incoming light beam 1 is polarised linearly in the direction of polarisation reflected by the first polarising beamsplitter cube 25, it is reflected losslessly. The light beam then passes through the first quarter wave retardation plate 27. Thus, the polarisation of first incident light beam 4 at the outlet of first beam guidance system 20 is circular. The first reflected light beam 23, obtained by reflecting the first light beam 4 incident on mirror 19, passes through first quarter wave retardation plate 27. Its circular polarisation is rendered linear even while it has rotated 90° relative to the polarisation of incoming light beam 1. The first reflected light beam 23 travels through the first polarising beamsplitter cube 25 without loss and reaches the retro reflection system 21, which serves to produce second incident light beam 8 on mirror 19. Second incident light beam 8 then passes through the second polarising beamsplitter cube 26 losslessly, then through second quarter wave retardation plate 28. Its polarisation becomes circular. The light beam reflected by mirror 19 and obtained from the second incident light beam 8 also passes through second quarter wave retardation plate 28. Its circular polarisation is rendered linear even while it has rotated 90° relative to the polarisation of second incident light beam 8. Finally, the polarisation of outgoing light beam 7, obtained by lossless deflection (or lossless reflection) of said light beam reflected by the second polarising beamsplitter cube 26, is parallel to that of incoming light beam 1.

If, as is shown in FIG. 7, first 20 and second 22 beam guidance systems each comprise a polarising beamsplitter cube (25, 26) and a quarter wave retardation plate (27, 28), it is possible to obtain an outgoing light beam 7 that is offset relative to an incoming light beam 1, without loss. This is also possible thanks to the use of a retro reflection system 21 able to maintain polarisation. Examples of retro reflection systems 21 able to maintain polarisation are: a combination of a Dove prism and one or two roof prisms; a combination of a Dove prism and two mirrors; five mirrors.

In the embodiments shown in FIGS. 2-7, light is reflected on one reflecting surface of the mirror 19. Moreover, the optical system 2 of the machining device 100 of the invention is configured such that first incident light beam 4 and the normal 16 to the mirror 19 are separated by an angle 15 comprised between 0° and 15° for all possible positions and orientation of the movable mirror 19, preferably between 0.01° and 5°, and still more preferably between 0.1° and 3°.

Figure 8:
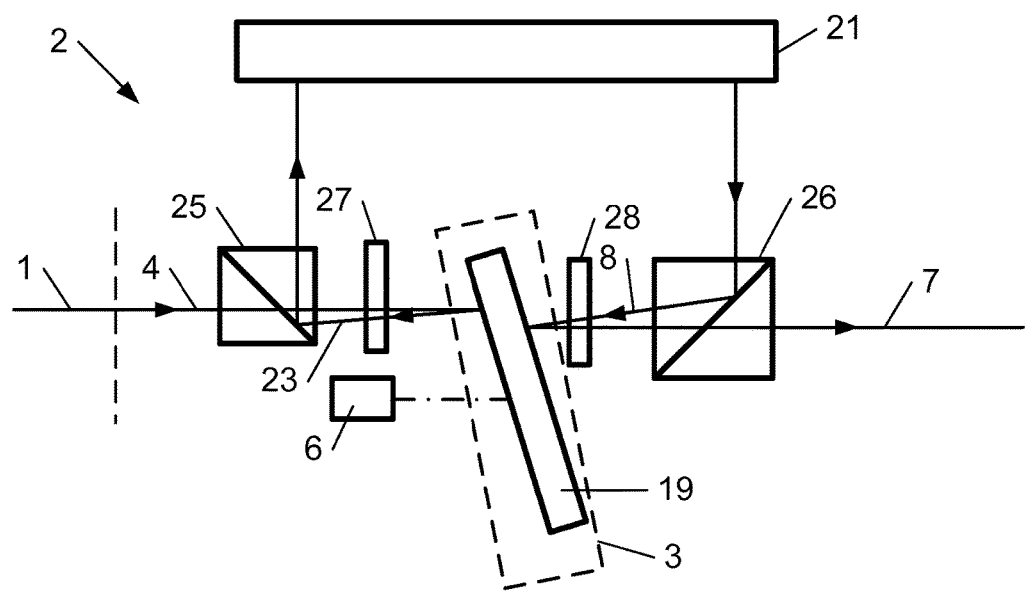
FIG. 8 shows another preferred embodiment of the optical system comprised in the machining device of the invention.

FIG. 8 shows another possible embodiment where the movable mirror 19 comprises two reflecting surfaces. A first reflecting surface allows obtaining a first reflecting light beam 23 from a first incident light beam 4 stemming from an incoming light beam 1. A second reflecting surface allows obtaining a reflection of a second incident light beam 8. Thanks to the use of a retro reflection system, and adapted first 20 and second 22 beam guidance systems, second incident light beam 8 is parallel to first reflecting light beam 23 whatever the position and orientation of the mirror 19. First incident light beam 4 and normal 16 to the mirror 19 (not shown for clarity) are separated by an angle 15 (not shown for clarity) comprised between 0° and 15°, preferably between 0.01° and 5°, and still more preferably between 0.1° and 3°. In the example shown in FIG. 8, first beam guidance system 20 (respectively second beam guidance system 22) comprises a first (respectively second) polarising beamsplitter cube 25 (respectively 26) and a first (respectively second) quarter wave retardation plate 27 (respectively 28). These elements are known to a person skilled in the art. The specifications of first polarising beamsplitter cube 25 and second polarising beamsplitter cube 26 are preferably identical. The specifications of first quarter wave retardation plate 27 and second quarter wave retardation plate 28 are preferably identical. The incoming light beam 1 is preferably polarised in the direction of polarisation which allows said light beam passing through the first polarising beamsplitter cube 25. The incoming light beam 1 then passes through the first quarter wave retardation plate 27 and the first reflected light beam 23, obtained by reflecting the first light beam 4 incident on mirror 19, passes through first quarter wave retardation plate 27. First reflected light beam 23 polarisation has rotated 90° relative to the polarisation of incoming light beam 1 and the first reflected light beam 23 is reflected by the first polarising beamsplitter cube 25 without loss and reaches retro-reflection system 21, which serves to produce second incident light beam 8. Second incident light beam 8 is then reflected lossless by the second polarising beamsplitter cube 26, then passes through second quarter wave retardation plate 28. Outgoing light beam 7 is obtained after reflection of the second incident light beam 8 on mirror 19. Then outgoing light beam 7 passes through second quarter wave retardation plate 28 and second polarising beamsplitter cube 26 without deflection. Outgoing light beam 7 is parallel to incoming light beam 1 for all positions and orientations of the mirror 19.

If, as is shown in FIG. 8, first 20 and second 22 beam guidance systems each comprise a polarising beamsplitter cube (25, 26) and a quarter wave retardation plate (27, 28), it is possible to obtain an outgoing light beam 7 that is offset relative to an incoming light beam 1, without loss. In the example shown in FIG. 8, the mirror 19 is rotatable completely about an axis of rotation that is not parallel to its normal 16. It is also possible to use for the embodiment shown in FIG. 8 a mirror 19 that is tiltable about at least two directions that are non-parallel, and driving means 6 capable of changing an inclination of the mirror 19 about these at least two directions. Then, maximum angle between first incident light beam 4 and the normal 16 to the mirror 19 is comprised between 0° and 15°, preferably between 0.01° and 5°, and still more preferably between 0.1° and 3°.

According to still another possible example of the embodiment shown in FIG. 8, the mirror 19 is rotatable completely about an axis of rotation 5 and tiltable, and the driving means 6 are capable of rotating the mirror 19 about said axis of rotation 5, and changing its inclination about one, two, or more directions.

The preferred embodiments of FIGS. 6 to 8 present similar advantages to those presented for the preferred embodiment of FIG. 5. First 4 and second 8 incident light beams hit the mirror 19 with an angle that can be chosen very close to 90° (thanks the deflections of about 90° carried out by first 20 and second 22 beam guidance systems, and the relative position of mirror 19 with respect to said first 20 and second 22 beam guidance systems). This allows having a precession ring described by the outgoing light beam 7 beyond the focussing means 9 that is nearly of perfect circle. First 4 and second 8 incident light beams hit the mirror 19 with same incident angles. This allows improving machining quality.

In the different embodiments shown in FIGS. 2-8, one could use a mirror 19 that is tiltable about two or more directions, rather than a mirror 19 able to depict complete revolutions about an axis of rotation. Then, driving means 6 are capable of changing an inclination of the mirror 19 about these two or more directions.

Figure 9A:
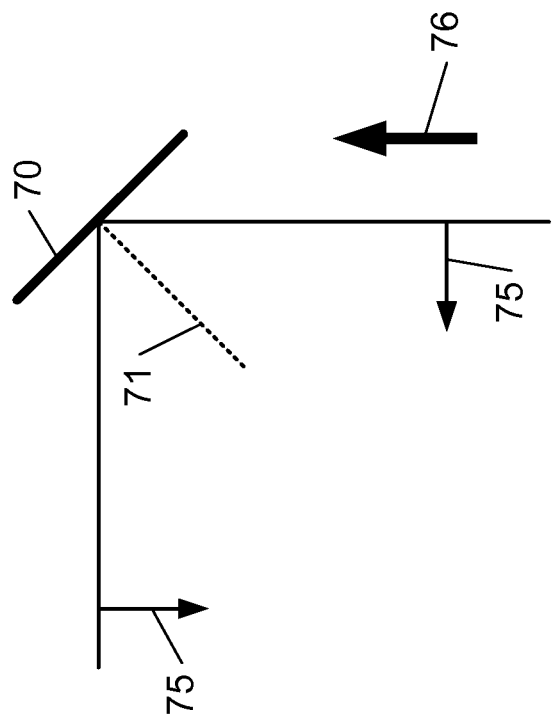
FIGS. 9a and 9b schematically show two possible configurations of reflection where polarization is maintained.
Figure 9B:
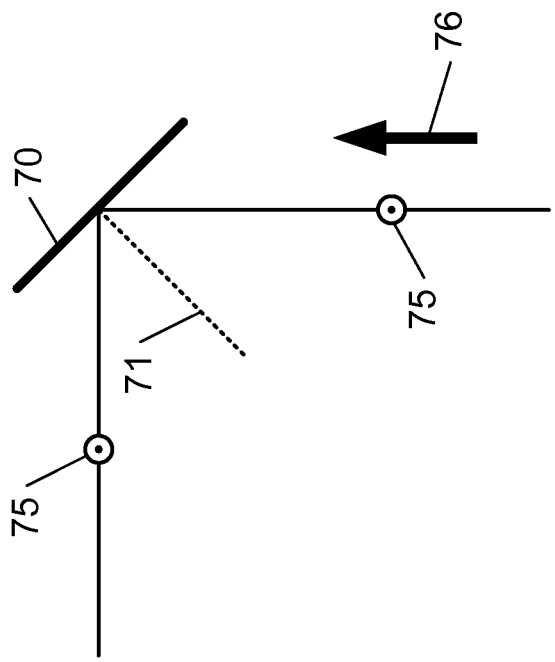

Preferably, retro reflection system 21 is able to maintain polarization of a light beam, and in particular of first reflected light beam 23. FIGS. 9a and 9b show two possible configurations where linear polarization 75 of a light beam is maintained when said light beam is reflected on a flat reflecting surface 70 defined by a normal 71 (arrow 76 stands for main direction of propagation of the light beam). According to a first possible configuration (FIG. 9(a)), linear polarization 75 is parallel to flat reflecting surface 70. According to a second possible configuration (FIG. 9(b)), linear polarization 75 is comprised in a plane perpendicular to flat reflecting surface 70. In both cases, polarization is maintained. This property can be used for designing a retro reflection system 21 that conserves polarization. In the retro reflection system 21, several reflections take place. For maintaining a linear polarization, two possible embodiments of the retro reflection system 21 are the followings:

having an even number of reflections on first planar reflecting surfaces of the retro reflection system 21 with the linear polarization parallel to said first planar reflecting surfaces, and an odd number of reflections on second planar reflecting surfaces with the linear polarization belonging to a plane perpendicular to said second planar reflecting surfaces;

having an odd number of reflections on first planar reflecting surfaces of the retro reflection system 21 with the linear polarization parallel to said first planar reflecting surfaces, and an even number of reflections on second planar reflecting surfaces of the retro reflection system 21 with the linear polarization belonging to a plane perpendicular to said second planar reflecting surfaces.

Figure 10:
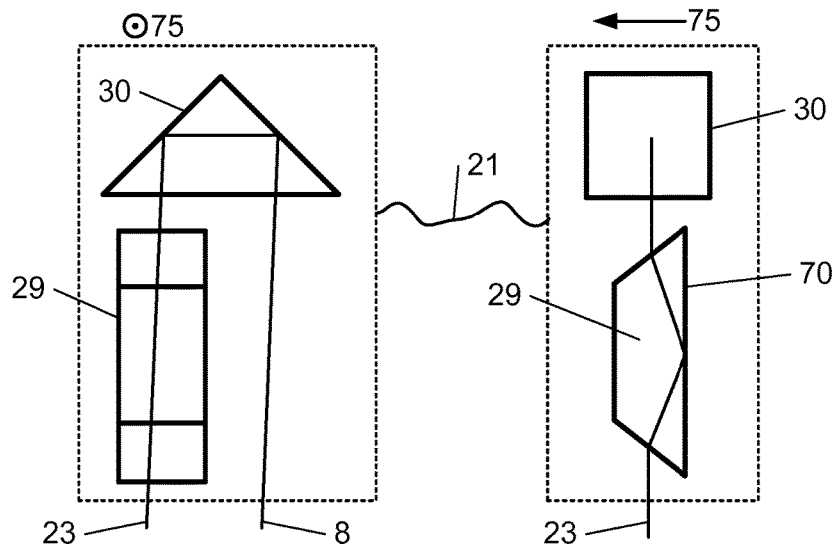
FIG. 10 shows one possible example of the retro reflection system.

Retro reflection system 21 may comprise various elements. Examples are (list incomplete): a cube corner, a combination comprising a Dove prism 29 and another prism 30, preferably a right-angled isosceles prism. This last combination is illustrated in FIG. 10, where left part shows a view from above while right part shows a side view. For the embodiment shown in FIG. 10 where the retro reflection system 21 comprises a Dove prism 29 and a right-angled isosceles prism 30, a linear polarization 75 of first reflected light beam 23 is maintained. Linear polarization 75 is parallel to the two flat reflecting surfaces of the right-angled isosceles prism 30 and comprised in a plane perpendicular to a flat reflecting surface 70 of the Dove prism 29. Second incident light beam 8 and first reflected light beam 23 are parallel for all positions and orientations of the mirror 19.

Figure 11:
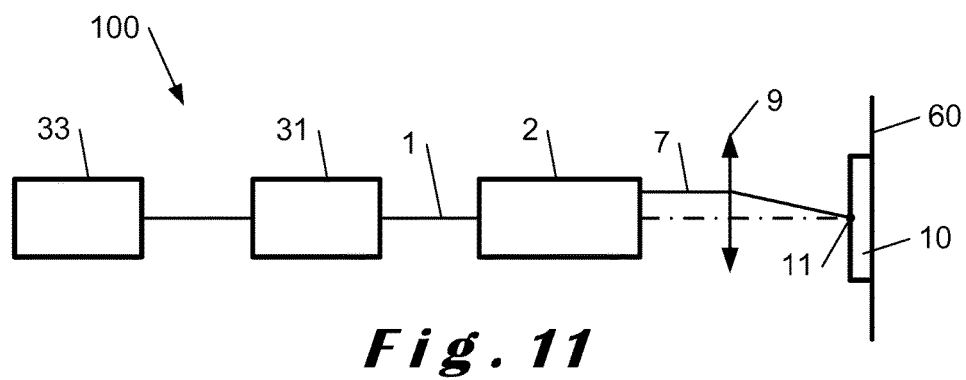
FIG. 11 schematically shows a possible machining device according to the first aspect of the invention.

FIG. 11 schematically shows a preferred embodiment of the machining device 100 of the invention. As is represented in this figure, the device 100 preferably comprises a primary optical system 31 for varying the collimation of incoming light beam 1. By adding this primary optical system 31 in front of optical system 2 that can cause the mirror 19 to rotate continuously, a user is able to create a hole whose diameter is determined by programmed defocussing. The user will also be able to create a ring around a natural focussing point. Greater depths may also be obtained by translating an element (a lens, for example) of the primary optical system 31 at the same time as the light beam is creating the hole. This feature may enable the invention to be used to create holes (drilling) without adding a deflection system (scanner) and while controlling the diameter of the hole by the divergence applied to incoming light beam 1 by primary optical system 31.

Figure 12:
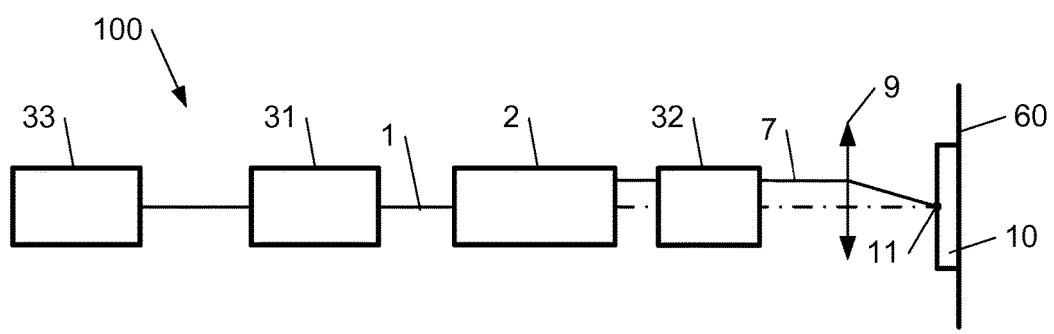
FIG. 12 schematically shows another possible machining device according to the first aspect of the invention.

FIG. 12 shows another preferred embodiment of the machining device 100. As is shown, this preferred embodiment further includes a deflection system 32 (a galvanometric scanner head for example) for shifting the outgoing light beam 7 directed at target 10 over the focussing field. This configuration is particularly suitable for manufacturing parts with complex geometries, such as the movement components in clock making, or implants in the medical device industry. Then, the machining device 100 preferably comprises a telecentric lens 9. This term is known by the one skilled in the art.

Different types of light source 33 can be used in the various examples described in the preceding text. By way of non-limiting examples, the following may be recited:

a $CO_2$ laser for cutting and drilling applications in metals with substantial thickness;

a laser diode or a fibre laser (multimode or monomode) in continuous mode, millisecond or nanosecond depending on the required precisions and heat zones concerned;

an ultra-short laser (picosecond or femtosecond) for high precision microcutting or microdrilling;

a femtosecond laser with a pulse duration between 300 fs and 10 ps, with a focal length smaller than 150 mm (and preferably 100 mm)

a UV laser (ns, ps or fs);

a visible laser (ns, ps or fs).

According to another aspect, the inventors suggest a method for machining a target 10 with a light beam, by using the machining device 100 described before.

The present invention has been described with reference to a specific embodiments, the purpose of which is purely illustrative, and they are not to be considered limiting in any way. In general, the present invention is not limited to the examples illustrated and/or described in the preceding text. Use of the verbs "comprise", "include", "consist of", or any other variation thereof, including the conjugated forms thereof, shall not be construed in any way to exclude the presence of elements other than those stated. Use of the indefinite article, "a" or "an", or the definite article "the" to introduce an element does not preclude the presence of a plurality of such elements. The reference numbers cited in the claims are not limiting of the scope thereof.

In summary, the invention may also be described as follows. Machining device 1 for machining a target 10 with a light beam, comprising:

a light source 33 for producing a light beam named incoming light beam 1, an optical system 2 for providing from said incoming light beam 1 an outgoing light beam 7 that is able to depict in a three-dimensional space a surface that is substantially cylindrical (and such that said outgoing light beam 7 remains parallel to a given direction upstream focusing means 9), said optical system 2 comprising:

a mirror 19 having a substantially flat reflecting surface defined by a normal 16 for obtaining a first reflected light beam 23 from a first incident light beam 4 stemming from said incoming light beam 1, movable such that its normal 16 is able to depict a trajectory in a three-dimensional space;

said optical system 2 being configured such that said first incident light beam 4 and said normal 16 to the movable mirror 19 are separated by an angle 15 comprised between 0° and 15° for all possible positions and orientations of said movable mirror 19;

driving means 6 for moving said movable mirror 19;

a retro reflection system 21:

positioned with respect to said movable mirror 19 for obtaining from said first reflected light beam 23 a second incident light beam 8 on said mirror 19 for all possible positions and orientations of said movable mirror 19, for obtaining an outgoing light beam (7) from a reflection of said second incident light beam (8) on said mirror 19, and able to provide said second incident light beam 8 on said movable mirror 19 that is parallel to said first reflected light beam 23 for all possible positions and orientations of said movable mirror 19;

focusing means 9 for focusing outgoing light beam 7 on a target 10.

The optical system 2 allows controlling the spatial offset between incoming 1 and outgoing 7 light beams. By varying the position and/or orientation of the mirror 19, it is possible to impose the outgoing light beam 7 to depict a surface that is substantially cylindrical. Thereafter, by using appropriate focussing means 9, it is possible to machine a target 10 at a small surface with the outgoing light beam 7 describing a movement of precession.

Preferably, the optical system 2 comprised in the machining device 100 comprises: a first beam guidance system 20 to deflect incoming light beam 1, preferably through 90°, and thus enabling the creation of a first incident light beam 4; a movable mirror 19 positioned such that it is able to receive said first incident light beam 4 and generate a corresponding first reflected light beam 23; driving means 6 for varying the position of said mirror 19 relative to said first beam guidance system 20; retro reflection system 21 for redirecting first reflected light beam 23 in order to obtain a second incident light beam 8 at said mirror 19, said second incident light beam 8 being anti-parallel to said first reflected light beam 23 for all positions and orientations of the mirror 19; a second beam guidance system 22 to deflect a light beam reflected on said mirror 19 (preferably through 90°) and obtained from said second incident light beam 8.

Thus, following the direction of incoming light beam 1, the various elements of optical system 2 receive the light in the following order: first beam guidance system 20, mirror 19, first beam guidance system 20 again (but preferably without deflection), retro reflection system 21, second beam guidance system 22 (preferably without deflection), mirror 19 again, and finally second beam guidance system 22 again (but this time preferably with deflection). The optical system 2 comprised in the machining device 100 thus enables the outgoing light beam 7 to be offset with respect to its nominal position very simply, enabling an angle of attack that is not zero to be created with target 10 (while outgoing light beam 7 remains parallel to a given position upstream focusing means 9). The amplitude of angle of attack of outgoing light beam 7 with target 10 can be defined as a function of the inclination of mirror 19 and/or its translation movement. The angular position of inclined mirror 19 (when mirror 19 is rotatable) enables the angle of attack a to be aligned in the focal plane.

The invention claimed is:

1. A machining device (100) comprising:

a light source (33);

an optical system (2) for obtaining from an incoming light beam (1) an outgoing light beam (7) that is spatially offset with respect to said incoming light beam (1), said optical system (2) comprising:

a mirror (19):

having a substantially flat reflecting surface defined by a normal (16) for obtaining a first reflected light beam (23) from a first incident light beam (4) stemming from said incoming light beam (1), movable such that its normal (16) is able to depict a trajectory in a three-dimensional space;

said optical system (2) being configured such that said first incident light beam (4) and said normal (16) to the movable mirror (19) are separated by an angle (15) comprised between 0° and 15° for all possible positions and orientations of said movable mirror (19);

driving means (6) for moving said movable mirror (19);

a retro reflection system (21):

positioned with respect to said movable mirror (19) for obtaining from said first reflected light beam (23) a second incident light beam (8) on said mirror (19) for all possible positions and orientations of said movable mirror (19), for obtaining an outgoing light beam (7) from a reflection of said second incident light beam (8) on said mirror (19), and able to provide said second incident light beam (8) on said movable mirror (19) that is parallel to said first reflected light beam (23) for all possible positions and orientations of said movable mirror (19); and focusing means (9) for focusing said outgoing light beam (7) on a target (10).

2. The machining device (100) according to claim 1, wherein said optical system (2) is configured such that said incident light beam (4) and said normal (16) to the movable mirror (19) are separated by an angle (15) comprised between 0.01° and 5° for all possible positions and orientations of said movable mirror (19), preferably by an angle (15) comprised between 0.1° and 3° and more preferably by an angle of 0.5°.

3. The machining device (100) according to claim 1, further comprising a deflection system (32) for shifting said outgoing light beam (7).

4. The machining device (100) according to claim 1, wherein said movable mirror (19) is able to depict a 360° rotation about an axis of rotation (5) that is secant to its normal (16), and said driving means (6) are capable of causing said mirror (19) to rotate about said axis of rotation (5).

5. The machining device (100) according to claim 1, wherein said movable mirror (19) is tiltable about two or more directions, and said driving means (6) are capable of changing an inclination of said mirror (19) about these two or more directions.

6. The machining device (100) according to claim 1, wherein said mirror (19) is translatable and said driving means (6) are capable of causing said mirror (19) to perform a translatory movement (24).

7. The machining device (100) according to claim 1, wherein said retro reflection system (21) is translatable and said driving means (6) are capable of causing said retro reflection system (21) to perform a translatory movement.

8. The machining device (100) according to claim 1, wherein said optical system (2) is configured such that first (4) and second (8) incident light beams are able to hit same flat reflecting surface of said mirror (19).

9. The machining device (100) according to claim 1, wherein:
said mirror (19) has two substantially flat reflecting surfaces:
each of them being defined by a normal,
one of them for obtaining said first reflected light beam (23) from said first incident light beam (4) stemming from said incoming light beam (1), and
another one for reflecting said second incident light beam (8) for providing said outgoing light beam (7).

10. The machining device (100) according to claim 1, wherein said retro reflection system (21) is able to maintain polarisation of a light beam.

11. The machining device (100) according to claim 1, wherein said retro reflection system (21) comprises a Dove prism (29) and a right-angle isosceles prism (30).

12. The machining device (100) according claim 1, wherein said retro reflection system (21) comprises five mirrors.

13. The machining device (100) according to claim 1, wherein said retro reflection system (21) comprises a cube corner.

14. The machining device (100) according to claim 1, wherein said optical system (2) further comprises a first beam guidance system (20) for obtaining said first incident light beam (4) by a deflection of the incoming light beam (1), and said movable mirror (19) is positioned between said driving means (6) and said first beam guidance system (20).

15. The machining device (100) according to claim 1, wherein said optical system (2) further comprises a second beam guidance system (22) for obtaining said outgoing light beam (7) by a deflection of a reflection of said second incident light beam (8) on said mirror (19), and said movable mirror (19) is positioned between said driving means (6) and said second beam guidance system (22).

16. The machining device (100) according to claim 1, wherein said optical system (2) further comprises a rotatable half wave plate for modifying a polarization of the incoming light beam (1), and means for rotating said half wave plate.

17. The machining device (100) according to claim 1, further comprising a primary optical system (31) for modifying a collimation of the incoming light beam (1).

18. The machining device (100) according to claim 1, further comprising positioning means (60) for moving said target (10) and/or a deflection system (32) for shifting said outgoing light beam (7), wherein the mirror (19) is movable, and wherein a position of the mirror (19) is rendered depending on the movement imposed by said deflection system (32) and/or on the position of the target (10).

19. A method for machining a target (10) comprising the steps of:
providing a machining device (100) according to claim 1;
switching on said light source (33) for providing said incoming light beam (1);
moving said mirror (19) by using said driving means (6) such that its normal depicts a trajectory in a three-dimensional space; and
positioning said target (10) such that said outgoing light beam (7) hits said target (10).

20. The method according to claim 19 for obtaining adjustable hole conicities in said target (10).

* * * * *